(12) United States Patent
Jiang et al.

(10) Patent No.: US 10,118,151 B2
(45) Date of Patent: Nov. 6, 2018

(54) COMPOSITE WITH SYNERGISTIC EFFECT OF ADSORPTION AND VISIBLE LIGHT CATALYTIC DEGRADATION AND PREPARATION METHOD AND APPLICATION THEREOF

(71) Applicant: SOOCHOW UNIVERSITY, Suzhou (CN)

(72) Inventors: Jun Jiang, Suzhou (CN); Jianmei Lu, Suzhou (CN); Najun Li, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 17 days.

(21) Appl. No.: 15/643,813

(22) Filed: Jul. 7, 2017

(65) Prior Publication Data
US 2018/0008953 A1    Jan. 11, 2018

(30) Foreign Application Priority Data

Jul. 8, 2016  (CN) .......................... 2016 1 0537149

(51) Int. Cl.
| | | |
|---|---|---|
| *C01B 31/08* | (2006.01) | |
| *B01J 20/02* | (2006.01) | |
| *B01J 20/26* | (2006.01) | |
| *B01J 20/30* | (2006.01) | |
| *B01J 35/00* | (2006.01) | |
| *C02F 1/28* | (2006.01) | |
| *C02F 1/30* | (2006.01) | |
| *C02F 1/72* | (2006.01) | |
| *C02F 101/30* | (2006.01) | |

(52) U.S. Cl.
CPC ......... *B01J 20/0259* (2013.01); *B01J 20/264* (2013.01); *B01J 20/3085* (2013.01); *B01J 35/004* (2013.01); *C02F 1/288* (2013.01); *C02F 1/30* (2013.01); *C02F 1/725* (2013.01); *C02F 2101/308* (2013.01); *C02F 2305/10* (2013.01); *Y02W 10/37* (2015.05)

(58) Field of Classification Search
CPC .................................................... B01J 20/0259
See application file for complete search history.

(56) References Cited

U.S. PATENT DOCUMENTS 5,409,769 A * 4/1995 Fukumoto .............. B01D 53/02
428/116

* cited by examiner

*Primary Examiner* — Stuart L Hendrickson
(74) *Attorney, Agent, or Firm* — SZDC Law P.C.

(57) ABSTRACT

The invention discloses a composite with an adsorption-visible light catalytic degradation synergistic effect and a preparation method and application thereof. The preparation method includes the specific steps that firstly, a bismuth oxyiodide/bismuth oxychloride composite nano-particle loaded activated carbon fiber composite ACF@BiOI$_x$Cl$_{1-x}$ is synthesized; then, the fiber surface is grafted with polyethyleneimine, and the end composite PEI-g-ACF@BiOI$_x$Cl$_{1-x}$ is obtained. The composite can rapidly adsorb pollutants in water, and meanwhile the pollutants are efficiently degraded with a photocatalyst loaded on the surface of the composite; besides, the purpose of recycling and reusing the photocatalyst is achieved, the comprehensive treatment capability of the composite is improved, the service life of the composite is prolonged, and the use cost is lowered.

8 Claims, 2 Drawing Sheets

COMPOSITE WITH SYNERGISTIC EFFECT OF ADSORPTION AND VISIBLE LIGHT CATALYTIC DEGRADATION AND PREPARATION METHOD AND APPLICATION THEREOF

This application claims priority to Chinese Patent Application No. 201610537149.2, filed on Jul. 8, 2016, which is incorporated by reference for all purposes as if fully set forth herein.

TECHNICAL FIELD

The invention belongs to the field of inorganic-polymer composite materials, specifically including a composite with the effect of adsorption and visible light catalytic degradation, preparation method of the composite, and its application in the treatment of organic pollution (such as organic dye) in water.

BACKGROUND ART

With the rapid development of dye industry in the country, discharge of dye waste water has become the type of hazard industrial wastewater. Dye waste water has the characteristics of complex composition, variability of water quality, high organic concentration, large alkaline, high colority, poor biodegradability and so on. It is difficult to deal with in industrial wastewater. Traditional treatment method for dye waste water are mainly include physical method (adsorption, membrane separation), chemical oxidation, and biological method. In these methods, adsorption mainly uses the porosity of the material to adsorb the pollutants in the water, so it needs post-processing of the material, the regeneration of the material and the reuse is difficult. Membrane separation can only separate the pollution, but can not completely degrade contaminants, and it is easy to cause blocking, need to be replaced regularly, so the operating cost is high. Chemical oxidation has good effect for the degradation of organic matter, but easy to produce precipitation or secondary pollution. Biological method is relatively more economical and easy to promote, but the microorganisms are highly strict with the operating conditions such as pH, temperature. It is difficult to adapt to dye waste water with variability of water quality, large alkaline and high toxicity. For the organic dye molecules with large molecular weight and complex structure, the microorganisms are even more powerless. Therefore, the search for efficient, green and economical dye wastewater treatment has become a hot topic at home and abroad.

In recent decades, the use of semiconductor photocatalytic degradation of pollutants has been studied extensively and deeply. Compared with the traditional technology, the photocatalytic technology directly uses the rich natural energy—the sun in degradation and mineralization of the various kinds of pollutants in the water and the air. It completely oxidizes the organic matter so as to avoid secondary pollution. In addition, the conditions of photocatalytic degradation are mild, without the need for external oxidants, the process is safe and the cost is low. Therefore, the use of green, efficient non-toxic and adaptable photocatalytic technology in the printing and dyeing wastewater treatment has shown great potential.

So far, a variety of photocatalysts have been developed, but the vast majority are nano-sized powder particles, so that it is easy to reunite and drain during use, not only difficult to recover, but also cause secondary pollution. In addition, although the photocatalyst with UV response has a high catalytic efficiency, but the utilization rate of total solar energy is low (UV is only 5% in the total solar energy and the visible light is 45%). It has been reported that by compositing a semiconductor with a light response in the ultraviolet region (with high photocatalytic efficiency, large bandgap width) and a semiconductor with larger band gap (photocatalytic in visible light but the catalytic efficiency is low), a binary composite photocatalyst with suitable band gap can be obtained, which can achieve light response in the visible light area to greatly improve the use of sunlight, but also has a high photocatalytic efficiency. However, the photocatalytic material can not actively enrich the air or water pollutants, greatly limiting the photocatalytic efficiency.

Invention Content

In response to such situation, the purpose of the present invention is to provide a recyclable composite with synergistic effect of adsorption and visible light catalytic degradation, the preparation method of the composite, and its application in the treatment of organic pollution.

In order to achieve the above purpose, the present invention adopts the follow technical scheme:

A preparation method of a composite with synergistic effect of adsorption and visible light catalytic degradation, which comprises the steps as below:

1) preparation of activated carbon fibers with bismuth oxyiodide/bismuth oxychloride composite nanoparticles immobilized on:

dissolving bismuth nitrate pentahydrate ($Bi(NO_3)_3 \cdot 5H_2O$) and activated carbon fiber (ACF) in solvent to obtain solution A; dissolving potassium iodide (KI) and potassium chloride (KCl) in solvent to obtain solution B; adding solution B to solution A under stirring, mixing evenly, then moving the reaction mixture to a hydrothermal reactor and reacting for 10 to 16 hours at 120 to 180° C., after the completion of the reaction, the reaction vessel is taken out, cooled and opened, and the fibrous product is collected by filtration, washed and dried to obtain bismuth oxyiodide/bismuth oxychloride composite nanoparticles immobilized activated carbon fiber composite ($ACF@BiOI_xCl_{1-x}$);

wherein, the molar ratio of bismuth nitrate pentahydrate, potassium iodide and potassium chloride is $1:x:(1-x)$, and $0<x<1$; the ratio of bismuth nitrate pentahydrate and activated carbon fiber is 1 mol:25~50 g;

2) the graft of polyethyleneimine:

dispersing the bismuth oxyiodide/bismuth oxychloride composite nanoparticles immobilized activated carbon fiber composite obtained in step 1) in solvent, adding silane coupling agent, reacting for 4 to 8 hours at 60 to 80° C. while stirring, then adding polyethyleneimine solution, continue stirring to react for 4 to 6 hours, after the reaction, the mixture is cooled and filtered to collect the fibrous product, washed and dried to obtain polyethyleneimine grafted bismuth oxyiodide/bismuth oxychloride composite nanoparticles immobilized activated carbon fiber composite ($PEI$-$g$-$ACF@BiOI_xCl_{1-x}$), that is a composite material with synergistic effect of adsorption and visible light catalytic degradation;

wherein, the ratio of said bismuth oxyiodide/bismuth oxychloride composite nanoparticles immobilized activated carbon fiber composite, silane coupling agent and polyethyleneimine solution is 50 mg:50 μL:1~10 g.

Preferably, in the above preparation method, said solvent in step 1) is either of water, ethyl alcohol, ethylene glycol, glycerol or any mixture thereof, preferably ethylene glycol.

Preferably, in the above preparation method, in step 1), the molar ratio of bismuth nitrate pentahydrate, potassium iodide and potassium chloride is 1:0.5:0.5 or 1:0.25:0.75.

Preferably, in the above preparation method, in step 1), the ratio of bismuth nitrate pentahydrate and activated carbon fiber is 1 mol:25 g.

Preferably, in the above preparation method, said solvent in step 2) is either of acetonitrile, N,N-Dimethylformamide, N,N-Dimethylethanolamine or any mixture thereof, preferably N,N-Dimethylformamide.

Preferably, in the above preparation method, said silane coupling agent in step 2) is (3-bromopropyl) trimethoxysilane or (3-chloropropyl) trimethoxysilane, preferably (3-bromopropyl) trimethoxysilane.

Preferably, in the above preparation method, in step 2), the mass concentration of said polyethyleneimine solution is 10%, wherein the $M_w$ of polyethyleneimine is 600~10000.

Preferably, in the above preparation method, the ratio of said bismuth oxyiodide/bismuth oxychloride composite nanoparticles immobilized activated carbon fiber composite, silane coupling agent and polyethyleneimine solution is 50 mg:50 μL:10 g.

A composite with synergistic effect of adsorption and visible light catalytic degradation, which is obtained according to the above preparation method.

An application of the above mentioned composite with synergistic effect of adsorption and visible light catalytic degradation for removing organic contaminant with negative charge (such as anionic dye) in water.

Compared with the prior art, the present invention has the advantages as followed:

(1) Binary bismuth oxyiodide/bismuth oxychloride composite nanoparticles immobilized activated carbon fiber composite (ACF@BiOI$_x$Cl$_{1-x}$) is a kind of macroscopic composite material obtained by loading nanometer photocatalyst on the surface of filamentous activated carbon fiber material, it has the characteristic of separable and reusable.

(2) ACF is a conductive substrate and ACF will greatly retard the recombination of photo-induced electrons and holes, which could significantly enhance the photocatalytic performance. It is more effective for the realization of degradation and removal of pollutants.

(3) Polyethyleneimine (PEI) is a water-soluble polymer, branched polyethylene imine structure is rich in amino groups, the surface with a positive charge, it can adsorp the anion dyes (such as azo dyes, acid dyes, etc.) in the water by electrostatic. In the present invention, low molecular weight PEI is modified to the surface of ACF @ BiOIxCl1-x by chemical grafting, which can not only protect the photocatalytic nanoparticle loaded and increase its mechanical properties in water, but also reduce the surface energy of the material to further improve the hydrophilicity of the surface of the material to increase the contact between the pollutant molecules and the surface of the material, so that the composite material has excellent adsorption characteristics;

(4) The polyethyleneimine grafted bismuth oxyiodide/bismuth oxychloride composite nanoparticles immobilized activated carbon fiber composite (PEI-g-ACF@BiOI$_x$Cl$_{1-x}$) in the present invention achieves efficient removal of organic pollutants (such as acid red organic dye molecules) in water through the synergistic effect of adsorption and visible light catalytic degradation. First, the organic pollutant molecules are enriched to the surface of the material by the adsorption of surface amino groups, then degraded under light. The material is regenerated by itself, which can be reused to improve the processing capacity and service life of the composites.

DETAILED DESCRIPTIONS

The invention will be made a further explanation according to the figures and the specific implementations. The chemicals, materials and instruments used in the following implementations can be obtained commercially.

Implementation 1: Preparation of bismuth oxyiodide/bismuth oxychloride composite nanoparticles immobilized activated carbon fiber composite (ACF@BiOI$_{0.5}$Cl$_{0.5}$).

At room temperature, dissolving Bi(NO$_3$)$_3$.5H$_2$O (2 mmol) and ACF (50 mg) in ethylene glycol (20 mL), to get solution A$_1$. Dissolving KI (1 mmol) and KCl (1 mmol) in ethylene glycol (20 mL), to get solution B$_1$. Adding solution B$_1$ dropwise to solution A$_1$, stirring for 2 h, transferring to a hydrothermal reactor and reacting for 12 h at 160° C. After reaction, taking out the reaction kettle, cooling and opening to collect the fibrous product by filtration, washing separately with deionized water and 95% ethanol twice, placing in a vacuum oven to dry at 60° C. for 12 h, to obtain the product ACF@BiOI$_{0.5}$Cl$_{0.5}$, the SEM image is shown in FIG. 1.

Figure 1:
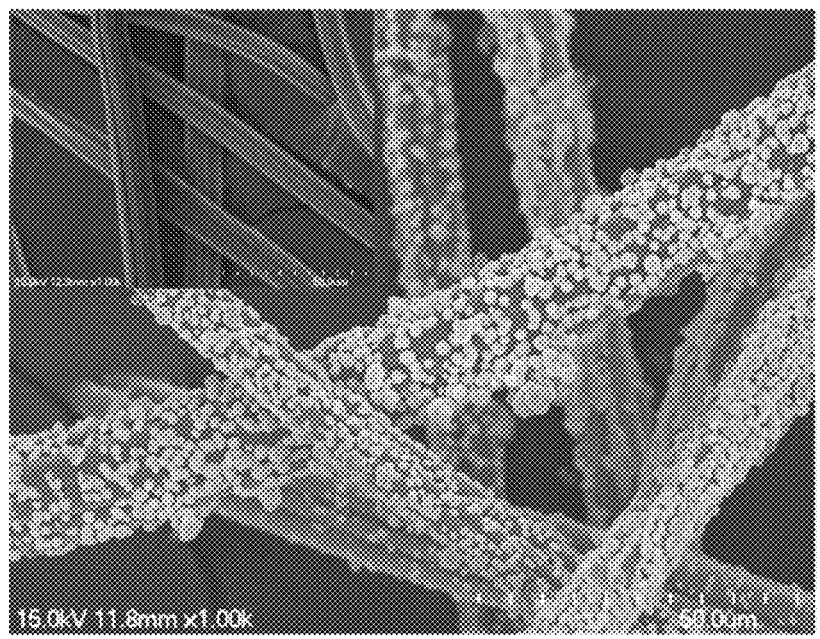
FIG. 1. SEM images of bismuth oxyiodide/bismuth oxychloride composite nanoparticles immobilized activated carbon fiber composite (ACF@BiOI$_x$Cl$_{1-x}$), and the SEM images of ACF without nanoparticles on the top left corner.

As shown in FIG. 1, in the composite material ACF@BiOI$_{0.5}$Cl$_{0.5}$, the composite nanoparticles BiOI$_{0.5}$Cl$_{0.5}$ were spherical and evenly distributed on the ACF surface.

Implementation 2: Preparation of bismuth oxyiodide/bismuth oxychloride composite nanoparticles immobilized activated carbon fiber composite (ACF@BiOI$_{0.25}$Cl$_{0.75}$).

At room temperature, dissolving Bi(NO$_3$)$_3$.5H$_2$O (2 mmol) and ACF (50 mg) in ethylene glycol (20 mL), to get solution A$_1$. Dissolving KI (0.5 mmol) and KCl (1.5 mmol) in ethylene glycol (20 mL), to get solution B$_2$. Adding solution B$_2$ dropwise to solution A$_1$, stirring for 2 h, transferring to a hydrothermal reactor and reacting for 12 h at 160° C. After reaction, taking out the reaction kettle, cooling and opening to collect the fibrous product by filtration, washing separately with deionized water and 95% ethanol twice, placing in a vacuum oven to dry at 60° C. for 12 h, to obtain the product ACF@BiOI$_{0.25}$Cl$_{0.75}$.

Implementation 3: Preparation of polyethyleneimine grafted bismuth oxyiodide/bismuth oxychloride composite nanoparticles immobilized activated carbon fiber composite (PEI-g-ACF@BiOI$_{0.5}$Cl$_{0.5}$).

Taking 50 mg ACF@BiOI$_{0.5}$Cl$_{0.5}$ obtained in Implementation 1, dissolving in 30 mL N,N-Dimethylformamide (DMF), adding 50 μL (3-bromopropyl) trimethoxysilane, stirring in oil bath at 80° C. for 6 h, then adding 10 g 10% PEI aqueous solution ($M_w$ of polyethyleneimine is 1200), stirring for 6 h. After reaction, cooling and collecting the fibrous product by filtration, washing separately with deionized water and 95% ethanol twice, drying to a constant weight, to obtain PEI-g-ACF@BiOI$_{0.5}$Cl$_{0.5}$.

From the IR spectrum of the PEI-g-ACF@BiOI$_{0.5}$Cl$_{0.5}$, it can be seen that the absorption peak at 3245 cm$^{-1}$ is the stretching vibration band of N—H on PEI. PEI-g-ACF@BiOI$_{0.5}$Cl$_{0.5}$ kept sharp peaks on (110) (101) (102) of $BiOI_{0.5}Cl_{0.5}$ in its XRD pattern, which coexisted that of the pure BiOI and BiOCl (indexed by JCPDS Card no. 70-2062 and no. 06-0249, respectively), It also indicates that the $BiOI_{0.5}Cl_{0.5}$ nanoparticles immobilized on the ACF surface and the grafting of PEI tightly remains the original phase structure.

Implementation 4: Photocatalytic experiment of PEI-g-ACF@$BiOI_{0.5}Cl_{0.5}$ towards Acid Red 1.

Figure 2:
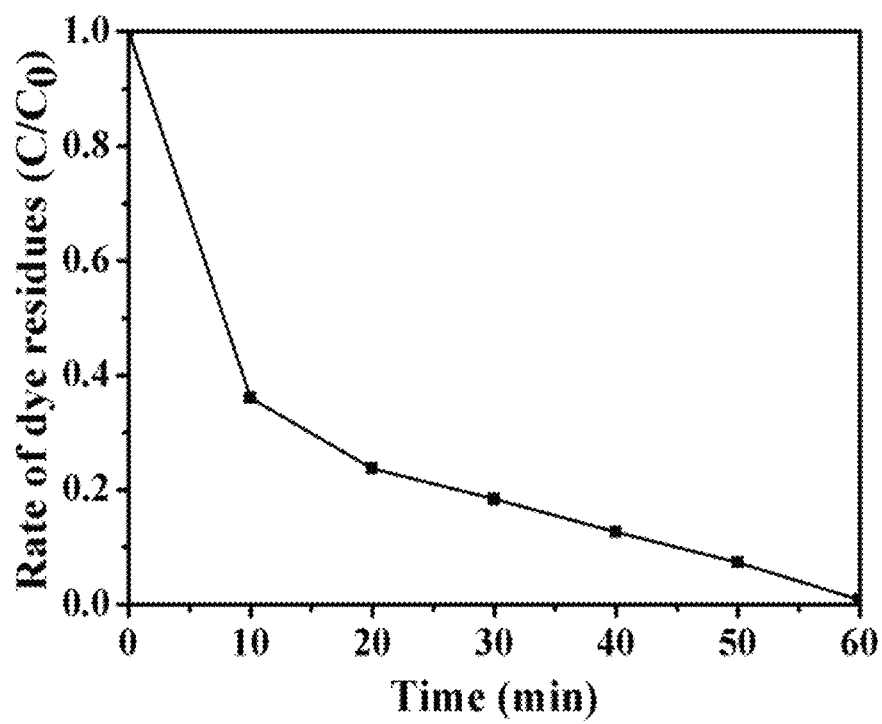
FIG. 2. Photocatalytic degradation patterns of 50 mg/l AR 1 over PEI-g-ACF@BiOI$_{0.5}$Cl$_{0.5}$ under 300 W Xenon lamp.

The 50 mg photocatalytic composites in implementation 3 were added into 50 ml AR 1 aqueous solution (50 mg/L) and stirred for 1.5 h in the illumination condition, the 3 ml suspension was analyzed every 10 min by UV-vis DRS at 530 nm, as shown in FIG. 2.

As shown in FIG. 2, the adsorption efficiency of PEI-g-ACF@$BiOI_{0.5}Cl_{0.5}$ to AR 1 was reached at 60% in 10 min. The 50 mL solution containing 50 ppm AR 1 was totally degraded from wastewater after 60 min by 50 mg of PEI-g-ACF@$BiOI_{0.5}Cl_{0.5}$. The excellent degradation efficiency of composite to AR 1 is attributed to the big absorption capacity on the synergistic adsorption-degradation process.

Implementation 5: Recycle experiment of PEI-g-ACF@$BiOI_{0.5}Cl_{0.5}$ towards Acid Red 1.

Figure 3:
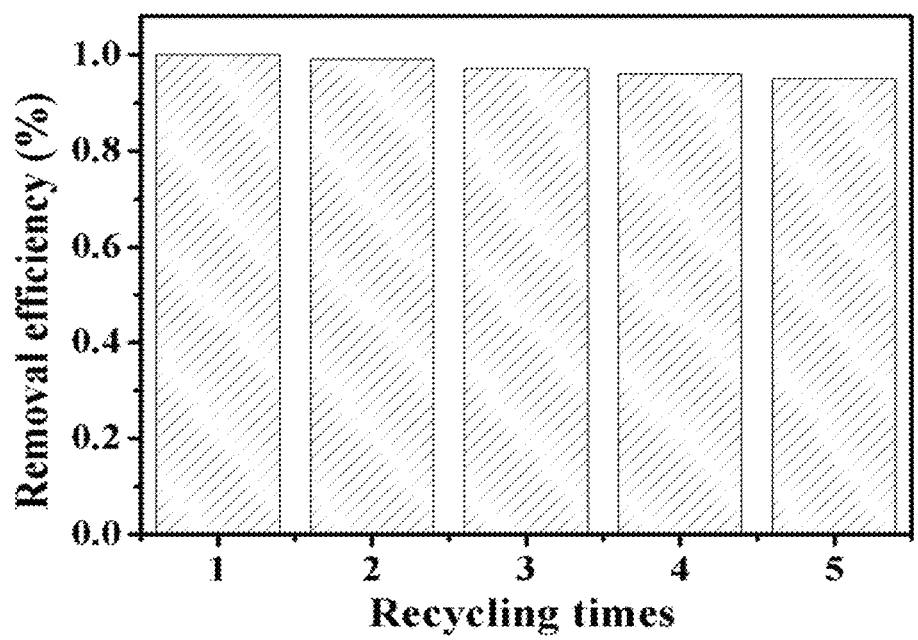
FIG. 3. Recycle of the PEI-g-ACF@BiOI$_{0.5}$Cl$_{0.5}$ for AR 1 removal from water.

The recycle photocatalyst of PEI-g-ACF@$BiOI_{0.5}Cl_{0.5}$ was continuously used for five cycles to degrade AR 1 solution under the same conditions. The 50 mg photocatalytic composites in implementation 4 were added into 50 ml AR 1 aqueous solution (50 mg/L) and stirred for 1.5 h in the illumination condition, the 3 ml suspension was analyzed every 10 min by UV-vis DRS at 530 nm, as shown in FIG. 3. After each cycle, PEI-g-ACF@$BiOI_{0.5}Cl_{0.5}$ was taken from the aqueous solution without centrifugation and then was washed thoroughly for the adsorption-photodegradation of a next batch of fresh AR 1 solution.

As shown in FIG. 3, the 50 ppm AR 1 in 50 mL aqueous solution could be degraded completely by 50 mg PEI-g-ACF@$BiOI_{0.5}Cl_{0.5}$ after recycled for five times, which meant the excellent photocatalytic performance of PEI-g-ACF@$BiOI_{0.5}Cl_{0.5}$ sample was still retained after reusing for several times without any regeneration process.

The invention claimed is:

1. A preparation method of a composite with synergistic effect of adsorption and visible light catalytic degradation, which comprises the steps as below:
   1) preparation of activated carbon fibers with bismuth oxyiodide/bismuth oxychloride composite nanoparticles immobilized on:
      dissolving bismuth nitrate pentahydrate and activated carbon fiber in solvent to obtain solution A; dissolving potassium iodide and potassium chloride in solvent to obtain solution B; adding solution B to solution A under stirring, mixing evenly, then moving the reaction mixture to a hydrothermal reactor and reacting for 10 to 16 hours at 120 to 180° C., after the completion of the reaction, the reaction vessel is taken out, cooled and opened, and the fibrous product is collected by filtration, washed and dried to obtain bismuth oxyiodide/bismuth oxychloride composite nanoparticles immobilized activated carbon fiber composite;
   wherein,
   the molar ratio of bismuth nitrate pentahydrate, potassium iodide and potassium chloride is 1:x:(1−x), and 0<x<1;
   the ratio of bismuth nitrate pentahydrate and activated carbon fiber is 1 mol:25~50 g;
   2) the graft of polyethyleneimine:
   dispersing the bismuth oxyiodide/bismuth oxychloride composite nanoparticles immobilized activated carbon fiber composite obtained in step 1) in solvent, adding silane coupling agent, reacting for 4 to 8 hours at 60 to 80° C. while stirring, then adding polyethyleneimine solution, continue stirring to react for 4 to 6 hours, after the reaction, the mixture is cooled and filtered to collect the fibrous product, washed and dried to obtain a composite material with synergistic effect of adsorption and visible light catalytic degradation;
   wherein,
   the ratio of said bismuth oxyiodide/bismuth oxychloride composite nanoparticles immobilized activated carbon fiber composite, silane coupling agent and polyethyleneimine solution is 50 mg:50 µL:1~10 g.

2. The preparation method according to claim 1, wherein: in step 1), said solvent is either of water, ethyl alcohol, ethylene glycol, glycerol or any mixture thereof.

3. The preparation method according to claim 1, wherein: in step 2), said solvent is either of acetonitrile, N,N-Dimethylformamide, N,N-Dimethylethanolamine or any mixture thereof.

4. The preparation method according to claim 1, wherein: in step 2), said silane coupling agent is (3-bromopropyl) trimethoxysilane or (3-chloropropyl) trimethoxysilane.

5. The preparation method according to claim 1, wherein: in step 2), the mass concentration of said polyethyleneimine solution is 10%, wherein the $M_w$ of polyethyleneimine is 600~10000.

6. A composite with synergistic effect of adsorption and visible light catalytic degradation, which is obtained according to the preparation method according to claim 1.

7. An application of the composite with synergistic effect of adsorption and visible light catalytic degradation according to claim 6 for removing organic contaminant with negative charge in water.

8. The application according to claim 7, wherein: said organic contaminant with negative charge is anionic dye.

* * * * *